2,944,883
Patented July 12, 1960

2,944,883
TREATMENT OF NICKEL-CONTAINING SULFIDE ORES

Paul Etienne Queneau, Fairfield, Conn., Stanley Charles Townshend, Clydach, Swansea, Wales, and Roland Stansfield Young, Victoria, British Columbia, Canada, assignors to The International Nickel Company, Inc., New York, N.Y., a corporation of Delaware No Drawing. Filed Feb. 6, 1958, Ser. No. 713,536

Claims priority, application Canada, Dec. 28, 1954

13 Claims. (Cl. 75—.5)

The present invention relates to a carbonyl extraction procedure for the treatment of nickel-containing sulfide material to recover nickel as metal of high purity, and particularly to an improved pressure carbonyl process for nickel and iron extraction or for nickel, cobalt, iron and copper separation and separate recovery from nickel-containing sulfide materials such as ores, concentrates, or crude metallurgical products derived therefrom, including those containing copper and precious metals.

It has now been discovered that nickel-containing sulfide material such as sulfide ores may be expeditiously and economically treated to extract nickel, cobalt and iron by a novel vapometallurgical process involving preparation, e.g., by ore-dressing methods, of a nickel sulfide concentrate having a controlled iron content, and also advantageously a controlled copper content, dead roasting of the sulfide concentrate to oxide, gaseous reduction of the resulting calcine to convert the desired metals to an active metallic state and treatment of the reduced calcine by carbon monoxide under pressure to co-extract nickel and cobalt and a substantial, controlled proportion of iron and, if desired, treatment of the solid, carbonyl-extracted residue to recover its residual metal content; or optionally smelting of a sulfide concentrate to a matte having a controlled iron content, dead roasting of this matte to oxide, gaseous reduction of the resulting calcine to convert the desired metals to their elemental state, and treatment of the reduced calcine by carbon monoxide under pressure to co-extract the nickel and the cobalt and a substantial, controlled proportion of iron, and treatment of the solid, carbonyl-extracted residue to recover such metals as copper, gold and platinum group metals which may be contained therein.

The many close similarities in the physical and chemical properties of iron, cobalt and nickel have made their separation a difficult operation in extraction metallurgy. Such separation is further complicated when copper is associated with these metals which is frequently the case. Industrial separation of iron from nickel may be accomplished by pyrometallurgical and hydrometallurgical means but these are usually characterized by total loss of the iron and substantial nickel losses. Industrial separation of copper and cobalt from nickel may be accomplished by a number of known procedures but these are subject to disadvantages such as high cost or complexity. In contradistinction, our vapometallurgical ore treatment permits a relatively clean and simple separation of all these metals on an industrial scale. Thus the novel procedures disclosed herein make possible the elimination of several or all of such standard commercial practices as furnace melting of nickel sulfide ores for rock mineral-nickel separation, converting of furnace mattes for iron-nickel separation, matte flotation or leaching for copper-nickel separation and oxidation of cobalt with chlorine for cobalt-nickel separation in aqueous circuits. The selective affinity of nickel, iron, and cobalt for carbon monoxide under our specified conditions, the lack of affinity of copper for carbon monoxide, and the simplicity of subsequent separation of the volatilized carbonyls give our process unique advantages for the treatment of materials containing these four metals. Our process based on relatively low temperature non-corrosive vapometallurgy is economical in labor, maintenance and energy, and yields pure metallic nickel, iron, and cobalt in few stages at a rapid rate.

The carbonyl extraction procedure of the present invention is an improvement on the basic discovery of Ludwig Mond in 1889. In the commercial Mond process, nickel-containing sulfide ores are treated to obtain a nickel matte, the matte is roasted to oxide which is then reduced to metal at relatively low temperatures with a strong, non-selective gas and volatilized by treatment with carbon monoxide at relatively low temperature and at atmospheric pressure. This process is currently employed for final refining of mattes rich in nickel, i.e., after elimination of almost all of the usual contaminants in the ore such as cobalt, iron, copper, precious metals, and rock minerals by other metallurgical procedures. One difficulty in applying this process to materials containing nickel and a substantial proportion of iron and cobalt resides in the fact that some of the iron and cobalt is reduced to the metallic state simultaneously with the nickel. As a result, a nickel-iron-cobalt alloy is formed which becomes less reactive to carbon monoxide as the iron and cobalt content of the alloy increases, such that the rate and extent of reaction with carbon monoxide under atmospheric pressure becomes unsatisfactory. This prior process does not volatilize cobalt present in the ore and little of the iron. Furthermore, the presence of large amounts of copper has been considered detrimental in the extraction of nickel by carbonyl procedures whereas we have found such copper is not detrimental to our novel pressure carbonyl process. To the contrary, our carbonyl procedure provides an excellent means of nickel-copper separation and recovery.

Our invention applies to the direct treatment of roasted and reduced nickel-bearing sulfide ore concentrates containing a major proportion of contaminants such as cobalt, iron, copper and rock minerals by special pressure carbonyl co-extraction of the nickel and cobalt and a substantial but controlled proportion of the iron, and to the treatment of a roasted and reduced matte derived from such concentrates but still containing a high proportion of contaminants by the aforementioned special pressure carbonyl co-extraction of the nickel and cobalt and a substantial but controlled proportion of the iron.

A primary object of the present invention is to provide an improved process for treatment of nickel-containing sulfide ores or crude metallurgical products derived therefrom to co-volatilize substantially all of the nickel and most of the cobalt and a substantial but controlled proportion of iron as carbonyl.

Another object of the invention is to provide an improved process for the separation from each other of elements from the group consisting of nickel, cobalt, iron and copper.

Still another object of the invention is to provide for recovery of precious and other metals such as copper in solid residues remaining after carbonyl extraction.

Other objects and advantages will become apparent from the following description.

Generally speaking, the present invention contemplates the treatment of nickel and/or cobalt-containing materials such as sulfide ores by a novel combination of special operations. Such materials may be first subjected to a beneficiation operation to produce a nickel sulfide concentrate, preferably one analyzing more than about 5% nickel and in which the ratio of iron to nickel is controlled so as not to be more than about 10 to 1 and advantageously may be at least about 1 to 4, although the material may have a smaller proportion of iron to nickel. Since usually a large proportion of the copper minerals in a nickel-bearing sulfide ore may be readily separated as a copper concentrate, we prefer for economic reasons that the nickel sulfide concentrates have a ratio of copper to nickel of less than about 1 to 10. Sometimes undue technical difficulties or costs are involved in treatment of ore for copper-nickel separation by mineral dressing techniques to obtain a copper to nickel ratio less than about 1 to 10 in the concentrate, and/or this concentrate may have a substantial precious metals content. In such cases, we prefer to smelt a concentrate to a copper and/or precious metals-bearing matte, even though such matte may have a copper to nickel ratio much higher than 1 to 10. This concentrate or matte is dead roasted, i.e., to a low-sulfur calcine containing not more than about 2% total sulfur. We desire to produce a substantially sulfur-free calcine, i.e., with only that minimum sulfur content which cannot readily be removed in large-scale practice. The role played by sulfur in our special volatilization procedure described hereinafter is significant in several respects. For example, a small amount of sulfur in an active form is important for metal activation but a large amount is deleterious due to undesirable nickel, iron and cobalt fixation. Accurate control of the quantity, nature and time of the subsequent sulfur addition as described hereinafter is therefore important. Improper control, such as one leading to a sulfur content in the calcine substantially above that herein disclosed, results in unsatisfactory metal volatilization. The calcine is subjected to a reducing atmosphere at elevated temperatures so as to convert a maximum proportion of the nickel and cobalt and a controlled proportion of the iron therein to an active metallic state. The material being treated may be conditioned for promotion of volatilization by treatment after the dead roasting operation, and before the end of the subsequent pressure treatment with carbon monoxide, with a controlled amount of sulfur or a sulfur-containing substance or a sulfur-bearing compound. The sulfur-conditioning operation should be so conducted as to result in a sulfur absorption equivalent to not substantially in excess of about 1% sulfur by weight of the original reduced material. The resulting product is then in such a condition that when reacted with carbon monoxide preferably at pressures more than about 300 p.s.i.g. (pounds per square inch gauge), but not more than about 1000 p.s.i.g. and at temperatures not less than about 175° F. such as at least about 200° F., and up to about 350° F., the ratio of volatilized iron to volatilized nickel is not more than about 2 to 1 and preferably not less than about 1 to 4, and in any event not less than about 1 to 7. The said reduced calcine is reacted with carbon monoxide under these conditions of pressure and temperature so as to form and volatilize as their carbonyls more than about 90% of the nickel, preferably most of the cobalt and a substantial but controlled proportion of the iron, leaving a solid residue containing the copper and precious metals which may have been present in the reduced calcine. This residue may be treated if desired for recovery of its metals content. The volatilized carbonyls are removed and separated from each other and are decomposed to produce pure nickel, cobalt and iron. The reduced calcine can be reacted with carbon monoxide at a pressure as low as about 150 p.s.i.g. and a temperature as low as about 150° F. However, these conditions of pressure and temperature are significantly inferior to those obtained within our preferred ranges.

The beneficiation treatment of the ore may be conducted in accordance with known mineral dressing techniques, for instance froth flotation and magnetic separation, in order to concentrate the nickel minerals by removal of rock minerals and excess iron or other sulfide or arsenide minerals such as those of copper or precious metals. We prefer to remove iron sulfide minerals from the ore in the manner, and for treatment by the process, disclosed in U.S. Patent No. 2,556,215. As hereinbefore stated, a concentrate may optionally be smelted to produce a matte. The iron content of this matte is controlled, i.e., to 10% or more by weight, in order to minimize loss of nickel and cobalt in slag and also in order to recover a substantial amount of iron as a high quality by-product.

The concentrate, obtained by the aforementioned beneficiation treatment, is roasted to not more than about 2% total sulfur and preferably also to less than about 1% sulfide sulfur. Advantageously, the roasting operation may be conducted in an oxidizing atmosphere at a temperature usually below about 1600° F. and not below about 1300° F. In order to convert a maximum proportion of the nickel and cobalt in the calcine to an active metallic state while concurrently converting a substantial but controlled proportion of the iron to an active metallic state, the calcine may then be reduced at a temperature not below about 1300° F., and not above about 1600° F. in a controlled atmosphere which can be obtained by the partial combustion of fuels, such as coal, oil, or natural gas, and containing a ratio of carbon monoxide to carbon dioxide ($CO:CO_2$) of not more than about 3:2 and not less than about 1:3. This reduction may be conducted using a reducing atmosphere having a ratio of $CO:CO_2$ of less than about 2:1 and not less than about 1:2, although an atmosphere having a $CO:CO_2$ ratio less than 2:1 and greater than about 3:2 is significantly inferior to atmospheres within the proposed $CO:CO_2$ ratio range of 3:2 to 1:3. It will, of course, be understood by those skilled in the art that the hydrogen to water vapor ($H_2:H_2O$) ratio of reducing gases at any given temperature is related to the $CO:CO_2$ ratio stated. The foregoing gas ratios are based on the proportion of CO and $CO_2$ in the atmosphere practically in equilibrium with the hot specially reduced charge in the furnace at the final reaction temperature. It will be understood that the presence of CO and $CO_2$ is not essential since, of course, similar results can be achieved by use of a hydrogen-water vapor system in which atmosphere the ratio of $H_2$ to $H_2O$ in a concurrent flow, reducing furnace is controlled to give a reduction potential of the exit gas equivalent to the above-stated CO to $CO_2$ ratios. The important factor is the production of a reduced product which will yield the required ratio of volatilized iron to volatilized nickel as specified hereinafter. Hence, other reducing conditions that yield this result may be employed. For instance, if the iron to nickel ratio in the calcine is unusually low, e.g., not substantially more than about 2:1, such as obtained from concentrates rich in pentlandite or from mattes, a reduced product which will yield the desired ratio of volatilized iron to volatilized nickel, discussed hereinafter, may be obtained by reducing the calcine with a non-selective gas at temperatures as low as 700° F.

Nickel-bearing sulfide materials usually contain cobalt and iron and frequently copper in such intimate association with the nickel that when a nickel sulfide concentrate is produced therefrom and is then roasted and reduced in accordance with this invention, the nickel, cobalt and a controlled amount of iron, and copper if present, in the material are converted to nickel-cobalt-iron-copper solid solutions. Complete volatilization of the nickel content of such solid solutions is substantially assisted by covolatilization of their metallic iron and cobalt contents since the latter elements, if left in the reduced calcine, have an inhibiting effect on the volatilization of nickel.

Although nickel, cobalt and iron in unusually high-grade roasted nickeliferous sulfide concentrates or in mattes may be reduced non-selectively, e.g., by hydrogen, such a reduction operation for concentrates currently produced commercially is generally less satisfactory than use of the foregoing special selective reduction technique. This is due to the deleterious effect of undue iron reduction, i.e., a ratio of iron to nickel substantially greater than 2 to 1, upon the subsequent volatilization step in that a higher carbon monoxide pressure is required to achieve a satisfactory rate and extent of extraction than is required in the case of reduced calcine lower in metallic iron content as produced in our special reducing atmosphere. The use of hydrogen in this case also results in higher capital and operating costs due to the higher cost of hydrogen itself, due to the cost of excessive iron reduction and due to the detrimental effect of such excessive iron on reducer operations which can occur by sticking of feed particles to each other and to the equipment if reduction temperature is high or non-metallic particle content is low.

We treat the aforementioned ore concentrate under controlled process conditions whereby the ratio of iron volatilized to nickel volatilized is not more than about 2:1 and is not less than about 1:7. The ratio of iron volatilized to nickel volatilized may be regulated by varying process conditions, e.g., varying the iron to nickel ratio of the concentrate, the $CO:CO_2$ ratio of the reducing gas, the temperature and time of the reducing operation, and the hereinafter-stated controlling factors of the volatilization operation. For example, if too high a proportion of iron is volatilized, the ratio of iron to nickel in the concentrate may be decreased by further beneficiation or by smelting of the concentrate to matte, or the $CO:CO_2$ ratio in the reducing gas may be decreased, or the temperature of the reduction operation may be increased, or the duration of the reduction operation may be decreased.

It has been known for about half a century that not only nickel but also cobalt and iron will react with carbon monoxide, under conditions suitable to the individual elements, to form carbonyls. However, so far as we know, in the past useful conditions providing for the volatilization of most of the nickel and cobalt together with substantial but controlled amounts of iron from nickel-containing sulfide ores or crude metallurgical products derived therefrom which may also contain an important amount of copper have not been disclosed. We have found that the volatilization of more than about 90% of the nickel and more than about 80% of the cobalt can be realized from complex materials containing substantial amounts of iron and copper if the iron is co-volatilized in the manner disclosed in this specification. For this purpose when treating such materials not less than the previously-stated minimum proportion of iron should be co-volatilized with the nickel and cobalt. However, excessive reduction of iron in an effort to volatilize more than the above-stated maximum proportion of iron should be avoided for reasons of both increased costs and decreased nickel volatilization at reasonably low pressures, i.e., pressures not more than about 1000 p.s.i.g.

In the case of concentrate having an important copper and/or precious metal content, for example, a ratio of copper to nickel greater than 1 to 10, if desired the concentrate can be smelted to an iron-bearing matte, as hereinbefore disclosed. Conventional practice in the industry is also to smelt such concentrate to matte, but to matte containing substantially no iron. The reason for this almost complete iron elimination is that if any substantial amount of iron were left in the matte, it would very adversely affect the prior art subsequent refining operations and in fact generally destroy their usefulness. For instance, the presently practiced Mond carbonyl process for nickel refining at atmospheric pressure is not suitable for treatment of nickel products containing iron in an amount of 10% or more by weight because both the rate and extent of nickel volatilization are seriously decreased by such iron, in addition to the iron's other detrimental effects on the process, i.e., contamination of the nickel product and degradation of the cobalt and precious metals-bearing residue. Similarly, electrorefining becomes exceedingly difficult due to the complexities attending iron elimination. In contradistinction thereto, in our novel process the presence of iron in the matte effects a sharp decrease in the loss of nickel and more particularly in the loss of cobalt and, of course, in the loss of iron, which losses occur incidental to iron removal from the matte by standard procedures, e.g., bessemerizing. Iron in the matte in proportions of about 10% or more serves to protect both nickel and cobalt from oxidation and their consequent undesired transfer from matte to slag. In this manner it is possible to decrease loss in slag of the order of 25% in the case of nickel and of the order of 50% in the case of cobalt. Since most of the iron left in the matte for this protective purpose is subsequently recovered by carbonyl extraction, an important amount of this metal is obtained as a high purity by-product whereas in conventional practice all of the iron is wasted.

Since the rate of volatilization of nickel under our conditions is somewhat higher than that of iron, it will be understood that the foregoing ratios of iron volatilized to nickel volatilized apply to the iron-nickel carbonyl mixture which has been evolved when not less than about 95% of the volatilizable nickel has been volatilized.

Sulfur conditioning for promotion of volatilization may be carried out by addition of sulfur or a sulfur-bearing compound, for instance, pyrite, to the dead roasted material prior to or during its reduction or by cooling the specially-reduced calcine and treating it with a sulfur-bearing compound, for instance, hydrogen sulfide, under conditions of time and temperature which will result in a sulfur absorption not substantially exceeding about 1% sulfur by weight of the original reduced material. Other forms of conditioning, either before, during or after reduction, or during volatilization, may be used, for example, as specified by U.S. Patent No. 1,909,762. It should be noted, however, that the employment of sulfur for promotion in our novel process is at variance in some respects to the art disclosed in this patent. For instance, this art is directed to the fixation of cobalt as sulfide in the residue whereas our process, to the contrary, is directed to the volatilization of this element. We provide only that minimum quantity of promoting sulfur which will result in maximizing the volatilization of nickel, iron, and cobalt, whereas the aforementioned U.S. patent is concerned solely with nickel volatilization which is improved under atmospheric pressure conditions by inactivating the cobalt as a sulfide. Furthermore, contrary to the aforementioned patent disclosure, the volatilizable metals content of mattes containing more than 14% copper can be usefully promoted by use of such sulfur compounds as hydrogen sulfide or iron sulfide.

We have found that cobalt volatilization can be maximized, with beneficial influence upon the extraction of nickel, by control in the amount and character of promoting sulfur, by selection of the time at which its addition is made, by variation in the reaction temperature, and by modification in the composition of the extracting gas. More specifically such cobalt volatilization may be accomplished in the presence of the nickel, copper and iron by either (a) varying the amount of sulfur added to the reduced calcine prior to volatilization, and/or (b) variation of the temperature during volatilization either upward or downward, advantageously in stages, within the volatilization temperature range of 175° F. to 350° F., with a portion of said pressure treatment conducted at temperatures in the lower half of the foregoing volatilization temperature range which promotes cobalt extraction, and/or (c) carrying out the critical sulfiding in a special manner. Case (b), wherein the temperature may be increased or decreased during the volatilization period, provides a novel method for overcoming the inherent difficulty, due to the low decomposition temperature of cobalt carbonyl, of obtaining maximum volatilization of nickel, cobalt and iron carbonyls in one operation. Thus, in our novel procedure one volatilization stage may be at a lower temperature than the other. This period at lower temperature, to promote cobalt extraction, may occur at any time during the course of the volatilization operation. The conditions are such that overall co-volatilization of nickel and iron is not substantially affected. In case (c) sulfur addition to the cooled, reduced calcine is initially not employed or is considerably less than that otherwise required and volatilization is allowed to proceed until a substantial proportion of the cobalt, together with some of the nickel and iron, is volatilized. The nickel and iron extractions are then completed after adding more sulfur to the partially extracted residue, for instance, by injecting a sulfur-bearing gas before or during volatilization. We prefer to treat the reduced calcine with sulfur in that minimum amount which will result in maximum volatilization of cobalt and nickel. The amount of sulfur depends on the quantity of nickel, iron and cobalt present in the material, but in any case it is an amount that will give an absorption not substantially exceeding about 1% sulfur by weight of the original reduced material.

We have also found that cobalt volatilization may be improved by the presence of active elemental nickel or of nickel carbonyl in approximately the lower half of the 175° F. to 350° F. volatilization temperature range, i.e., at not less than about 175° F. but less than about 275° F., with or without variation of the volatilization temperature, advantageously under static gas conditions, during the pressure treatment. The whole of the volatilization operation may be conducted advantageously also in this 175° F. to 275° F. temperature range in two stages with one stage under static gas conditions in the presence of elemental nickel and/or nickel carbonyl and the other stage under flowing gas conditions. If, therefore, a cobalt bearing material contains little or no nickel, addition of active nickel thereto prior to pressure volatilization may be advantageous.

We thus have a carbonyl extraction procedure, carried out in the presence of a carefully controlled minimal amount of sulfur, which provides a novel, practical method for extracting cobalt from cobalt-containing materials at lower pressures and costs than had heretofore been considered possible and its conversion into metal of a purity higher than any now commercially available.

It is important that the reduced calcine be treated with carbon monoxide under a pressure above about 300 and not more than about 1000 p.s.i.g. and at a temperature within the range above about 175° F. and not above about 350° F. to form mixed cobalt, nickel and iron carbonyls in order to obtain high, rapid and economical metal extraction. Furthermore, this pressure range also permits maximum subsequent condensation of the carbonyl burden of the volatilizer exit gases without excessive cooling, thereby yielding carbon monoxide at operating pressure for recirculation with minimum carbonyl content. Another important reason for this pressure range is that the concentration of carbonyl in the vapor phase in equilibrium with carbonyl in the liquid phase, in the presence of carbon monoxide, decreases with increase in carbon monoxide partial pressure to a satisfactory low value within our preferred range but with further increase in carbon monoxide partial pressure the vapor concentration of carbonyl starts rising again. Cooling is preferably carried out to below 60° F. and above 32° F. Make-up gas for the volatilization operation should preferably contain at least 90% carbon monoxide.

The mixed nickel, cobalt and iron carbonyls condensed from the exit volatilizer gases by cooling under pressure may be separated as desired, e.g., by cooling to cause crystallization of the cobalt carbonyl, followed by fractional distillation to separate the remaining nickel and iron carbonyls or by initial fractional distillation to remove individually the nickel and iron carbonyls in that order, followed by separation of cobalt from the residues in the still or by other methods such as fractional crystallization from various solvents or by such means as fractional sublimation, decomposition, diffusion and absorption.

The separated nickel, iron and cobalt carbonyls may be decomposed to yield pure metals in either powder or massive form by procedures well known to those skilled in the art.

The conditions for preparation and reduction of the concentrate, matte or other calcines described hereinbefore are such that the residue from volatilization can be satisfactorily treated by leaching for recovery of unextracted metal values, such as copper or precious metals as well as any residual nickel and cobalt. Furthermore, the preceding carbonyl extraction of the reduced calcine has a beneficial effect on subsequent metal extraction by leaching of the volatilizer residue. Thus, this residue may be treated for nickel, cobalt and copper recovery by aqueous leaching, for instance in ammoniacal solution at a pressure less than about 1000 p.s.i.g. followed, if desired, by carbonyl extraction of the resulting solution at more than about 300 p.s.i.g. Other methods can, of course, also be employed, such as melting of the residue from volatilization to a copper-iron-precious metals matte or directly to anodes for electrolysis. If matte is produced, removal of iron and sulfur therefrom can be accomplished by converting and the resulting blister copper can be refined for the production of pure copper and pure precious metals and recovery of any nickel or cobalt.

*Example I*

A dead roasted nickel concentrate prepared so as to contain 0.50% cobalt, 10.1% nickel, 36.1% iron, and 1.4% sulfur was reduced at 1400° F. with a gas mixture comprising carbon monoxide, carbon dioxide, hydrogen and water vapor and having a carbon monoxide to carbon dioxide ratio of 1:2. After cooling in this gas to 70° F., the reduced calcine was treated with a controlled stream of hydrogen sulfide at this temperature and volatilized with 99% carbon monoxide gas at 600 p.s.i.g. and a temperature of 250° F. This resulted in the extraction of 96% of the nickel and 19% of the iron present in the volatilizer feed, corresponding on a weight basis to about 0.7 part iron to 1 part nickel.

*Example II*

A dead roasted nickel concentrate prepared so as to analyze 0.43% copper, 7.6% nickel, 47.0% iron and 1.8% sulfur was specially reduced at 1500° F. with a $CO$, $CO_2$, $H_2$, $H_2O$ gas mixture, having a $CO:CO_2$ ratio of 1:2, cooled in the gas to 70° F., treated with a controlled stream of hydrogen sulfide at this temperature and volatilized with 99% carbon monoxide gas at 500 p.s.i.g. and 225° F. This resulted in the extraction of 93% of the nickel and 9% of the iron present in the volatilizer feed, corresponding on a weight basis to about 0.6 part iron to 1 part nickel. To illustrate the advantages of our preferred special reduction procedure over that of reduction with hydrogen in which the reducing conditions are not regulated in accordance with the present invention, another portion of the same roasted nickel concentrate was treated under similar conditions except that the gas mixture was replaced by hydrogen. The nickel and iron extractions were, respectively, 76% and 81%, corresponding on a weight basis to about 7 parts iron to 1 part nickel or about 12 times the iron volatilized per unit weight of nickel volatilized by our preferred special reduction technique.

*Example III*

A dead roasted nickel concentrate prepared so as to contain 0.26% copper, 7.08% nickel, 0.18% cobalt, 48% tion, i.e., a ratio of iron to nickel substantially greater than 2 to 1, upon the subsequent volatilization step in that a higher carbon monoxide pressure is required to achieve a satisfactory rate and extent of extraction than is required in the case of reduced calcine lower in metallic iron content as produced in our special reducing atmosphere. The use of hydrogen in this case also results in higher capital and operating costs due to the higher cost of hydrogen itself, due to the cost of excessive iron reduction and due to the detrimental effect of such excessive iron on reducer operations which can occur by sticking of feed particles to each other and to the equipment if reduction temperature is high or non-metallic particle content is low.

We treat the aforementioned ore concentrate under controlled process conditions whereby the ratio of iron volatilized to nickel volatilized is not more than about 2:1 and is not less than about 1:7. The ratio of iron volatilized to nickel volatilized may be regulated by varying process conditions, e.g., varying the iron to nickel ratio of the concentrate, the $CO:CO_2$ ratio of the reducing gas, the temperature and time of the reducing operation, and the hereinafter-stated controlling factors of the volatilization operation. For example, if too high a proportion of iron is volatilized, the ratio of iron to nickel in the concentrate may be decreased by further beneficiation or by smelting of the concentrate to matte, or the $CO:CO_2$ ratio in the reducing gas may be decreased, or the temperature of the reduction operation may be increased, or the duration of the reduction operation may be decreased.

It has been known for about half a century that not only nickel but also cobalt and iron will react with carbon monoxide, under conditions suitable to the individual elements, to form carbonyls. However, so far as we know, in the past useful conditions providing for the volatilization of most of the nickel and cobalt together with substantial but controlled amounts of iron from nickel-containing sulfide ores or crude metallurgical products derived therefrom which may also contain an important amount of copper have not been disclosed. We have found that the volatilization of more than about 90% of the nickel and more than about 80% of the cobalt can be realized from complex materials containing substantial amounts of iron and copper if the iron is co-volatilized in the manner disclosed in this specification. For this purpose when treating such materials not less than the previously-stated minimum proportion of iron should be co-volatilized with the nickel and cobalt. However, excessive reduction of iron in an effort to volatilize more than the above-stated maximum proportion of iron should be avoided for reasons of both increased costs and decreased nickel volatilization at reasonably low pressures, i.e., pressures not more than about 1000 p.s.i.g.

In the case of concentrate having an important copper and/or precious metal content, for example, a ratio of copper to nickel greater than 1 to 10, if desired the concentrate can be smelted to an iron-bearing matte, as hereinbefore disclosed. Conventional practice in the industry is also to smelt such concentrate to matte, but to matte containing substantially no iron. The reason for this almost complete iron elimination is that if any substantial amount of iron were left in the matte, it would very adversely affect the prior art subsequent refining operations and in fact generally destroy their usefulness. For instance, the presently practiced Mond carbonyl process for nickel refining at atmospheric pressure is not suitable for treatment of nickel products containing iron in an amount of 10% or more by weight because both the rate and extent of nickel volatilization are seriously decreased by such iron, in addition to the iron's other detrimental effects on the process, i.e., contamination of the nickel product and degradation of the cobalt and precious metals-bearing residue. Similarly, electrorefining becomes exceedingly difficult due to the complexities attending iron elimination. In contradistinction thereto, in our novel process the presence of iron in the matte effects a sharp decrease in the loss of nickel and more particularly in the loss of cobalt and, of course, in the loss of iron, which losses occur incidental to iron removal from the matte by standard procedures, e.g., bessemerizing. Iron in the matte in proportions of about 10% or more serves to protect both nickel and cobalt from oxidation and their consequent undesired transfer from matte to slag. In this manner it is possible to decrease loss in slag of the order of 25% in the case of nickel and of the order of 50% in the case of cobalt. Since most of the iron left in the matte for this protective purpose is subsequently recovered by carbonyl extraction, an important amount of this metal is obtained as a high purity by-product whereas in conventional practice all of the iron is wasted.

Since the rate of volatilization of nickel under our conditions is somewhat higher than that of iron, it will be understood that the foregoing ratios of iron volatilized to nickel volatilized apply to the iron-nickel carbonyl mixture which has been evolved when not less than about 95% of the volatilizable nickel has been volatilized.

Sulfur conditioning for promotion of volatilization may be carried out by addition of sulfur or a sulfur-bearing compound, for instance, pyrite, to the dead roasted material prior to or during its reduction or by cooling the specially-reduced calcine and treating it with a sulfur-bearing compound, for instance, hydrogen sulfide, under conditions of time and temperature which will result in a sulfur absorption not substantially exceeding about 1% sulfur by weight of the original reduced material. Other forms of conditioning, either before, during or after reduction, or during volatilization, may be used, for example, as specified by U.S. Patent No. 1,909,762. It should be noted, however, that the employment of sulfur for promotion in our novel process is at variance in some respects to the art disclosed in this patent. For instance, this art is directed to the fixation of cobalt as sulfide in the residue whereas our process, to the contrary, is directed to the volatilization of this element. We provide only that minimum quantity of promoting sulfur which will result in maximizing the volatilization of nickel, iron, and cobalt, whereas the aforementioned U.S. patent is concerned solely with nickel volatilization which is improved under atmospheric pressure conditions by inactivating the cobalt as a sulfide. Furthermore, contrary to the aforementioned patent disclosure, the volatilizable metals content of mattes containing more than 14% copper can be usefully promoted by use of such sulfur compounds as hydrogen sulfide or iron sulfide.

We have found that cobalt volatilization can be maximized, with beneficial influence upon the extraction of nickel, by control in the amount and character of promoting sulfur, by selection of the time at which its addition is made, by variation in the reaction temperature, and by modification in the composition of the extracting gas. More specifically such cobalt volatilization may be accomplished in the presence of the nickel, copper and iron by either (a) varying the amount of sulfur added to the reduced calcine prior to volatilization, and/or (b) variation of the temperature during volatilization either upward or downward, advantageously in stages, within the volatilization temperature range of 175° F. to 350° F., with a portion of said pressure treatment conducted at temperatures in the lower half of the foregoing volatilization temperature range which promotes cobalt extraction, and/or (c) carrying out the critical sulfiding in a special manner. Case (b), wherein the temperature may be increased or decreased during the volatilization period, provides a novel method for overcoming the inherent difficulty, due to the low decomposition temperature of cobalt carbonyl, of obtaining maximum volatilization of nickel, cobalt and iron carbonyls in one operation. Thus, in our novel procedure one volatilization stage may be at a lower temperature than the other. This period at lower temperature, to promote cobalt extraction, may occur at any time during the course of the volatilization operation. The conditions are such that overall co-volatilization of nickel and iron is not substantially affected. In case (c) sulfur addition to the cooled, reduced calcine is initially not employed or is considerably less than that otherwise required and volatilization is allowed to proceed until a substantial proportion of the cobalt, together with some of the nickel and iron, is volatilized. The nickel and iron extractions are then completed after adding more sulfur to the partially extracted residue, for instance, by injecting a sulfur-bearing gas before or during volatilization. We prefer to treat the reduced calcine with sulfur in that minimum amount which will result in maximum volatilization of cobalt and nickel. The amount of sulfur depends on the quantity of nickel, iron and cobalt present in the material, but in any case it is an amount that will give an absorption not substantially exceeding about 1% sulfur by weight of the original reduced material.

We have also found that cobalt volatilization may be improved by the presence of active elemental nickel or of nickel carbonyl in approximately the lower half of the 175° F. to 350° F. volatilization temperature range, i.e., at not less than about 175° F. but less than about 275° F., with or without variation of the volatilization temperature, advantageously under static gas conditions, during the pressure treatment. The whole of the volatilization operation may be conducted advantageously also in this 175° F. to 275° F. temperature range in two stages with one stage under static gas conditions in the presence of elemental nickel and/or nickel carbonyl and the other stage under flowing gas conditions. If, therefore, a cobalt bearing material contains little or no nickel, addition of active nickel thereto prior to pressure volatilization may be advantageous.

We thus have a carbonyl extraction procedure, carried out in the presence of a carefully controlled minimal amount of sulfur, which provides a novel, practical method for extracting cobalt from cobalt-containing materials at lower pressures and costs than had heretofore been considered possible and its conversion into metal of a purity higher than any now commercially available.

It is important that the reduced calcine be treated with carbon monoxide under a pressure above about 300 and not more than about 1000 p.s.i.g. and at a temperature within the range above about 175° F. and not above about 350° F. to form mixed cobalt, nickel and iron carbonyls in order to obtain high, rapid and economical metal extraction. Furthermore, this pressure range also permits maximum subsequent condensation of the carbonyl burden of the volatilizer exit gases without excessive cooling, thereby yielding carbon monoxide at operating pressure for recirculation with minimum carbonyl content. Another important reason for this pressure range is that the concentration of carbonyl in the vapor phase in equilibrium with carbonyl in the liquid phase, in the presence of carbon monoxide, decreases with increase in carbon monoxide partial pressure to a satisfactory low value within our preferred range but with further increase in carbon monoxide partial pressure the vapor concentration of carbonyl starts rising again. Cooling is preferably carried out to below 60° F. and above 32° F. Make-up gas for the volatilization operation should preferably contain at least 90% carbon monoxide.

The mixed nickel, cobalt and iron carbonyls condensed from the exit volatilizer gases by cooling under pressure may be separated as desired, e.g., by cooling to cause crystallization of the cobalt carbonyl, followed by fractional distillation to separate the remaining nickel and iron carbonyls or by initial fractional distillation to remove individually the nickel and iron carbonyls in that order, followed by separation of cobalt from the residues in the still or by other methods such as fractional crystallization from various solvents or by such means as fractional sublimation, decomposition, diffusion and absorption.

The separated nickel, iron and cobalt carbonyls may be decomposed to yield pure metals in either powder or massive form by procedures well known to those skilled in the art.

The conditions for preparation and reduction of the concentrate, matte or other calcines described hereinbefore are such that the residue from volatilization can be satisfactorily treated by leaching for recovery of unextracted metal values, such as copper or precious metals as well as any residual nickel and cobalt. Furthermore, the preceding carbonyl extraction of the reduced calcine has a beneficial effect on subsequent metal extraction by leaching of the volatilizer residue. Thus, this residue may be treated for nickel, cobalt and copper recovery by aqueous leaching, for instance in ammoniacal solution at a pressure less than about 1000 p.s.i.g. followed, if desired, by carbonyl extraction of the resulting solution at more than about 300 p.s.i.g. Other methods can, of course, also be employed, such as melting of the residue from volatilization to a copper-iron-precious metals matte or directly to anodes for electrolysis. If matte is produced, removal of iron and sulfur therefrom can be accomplished by converting and the resulting blister copper can be refined for the production of pure copper and pure precious metals and recovery of any nickel or cobalt.

*Example I*

A dead roasted nickel concentrate prepared so as to contain 0.50% copper, 10.1% nickel, 36.1% iron, and 1.4% sulfur was reduced at 1400° F. with a gas mixture comprising carbon monoxide, carbon dioxide, hydrogen and water vapor and having a carbon monoxide to carbon dioxide ratio of 1:2. After cooling in this gas to 70° F., the reduced calcine was treated with a controlled stream of hydrogen sulfide at this temperature and volatilized with 99% carbon monoxide gas at 600 p.s.i.g. and a temperature of 250° F. This resulted in the extraction of 96% of the nickel and 19% of the iron present in the volatilizer feed, corresponding on a weight basis to about 0.7 part iron to 1 part nickel.

*Example II*

A dead roasted nickel concentrate prepared so as to analyze 0.43% copper, 7.6% nickel, 47.0% iron and 1.8% sulfur was specially reduced at 1500° F. with a $CO$, $CO_2$, $H_2$, $H_2O$ gas mixture, having a $CO:CO_2$ ratio of 1:2, cooled in the gas to 70° F., treated with a controlled stream of hydrogen sulfide at this temperature and volatilized with 99% carbon monoxide gas at 500 p.s.i.g. and 225° F. This resulted in the extraction of 93% of the nickel and 9% of the iron present in the volatilizer feed, corresponding on a weight basis to about 0.6 part iron to 1 part nickel. To illustrate the advantages of our preferred special reduction procedure over that of reduction with hydrogen in which the reducing conditions are not regulated in accordance with the present invention, another portion of the same roasted nickel concentrate was treated under similar conditions except that the gas mixture was replaced by hydrogen. The nickel and iron extractions were, respectively, 76% and 81%, corresponding on a weight basis to about 7 parts iron to 1 part nickel or about 12 times the iron volatilized per unit weight of nickel volatilized by our preferred special reduction technique.

*Example III*

A dead roasted nickel concentrate prepared so as to contain 0.26% copper, 7.08% nickel, 0.18% cobalt, 48% metals therein, including nickel, cobalt, iron, copper and precious metals, which comprises beneficiating the ore to obtain a sulfide mineral concentrate; smelting the concentrate to an iron-bearing matte containing at least about 10% iron; roasting the matte to produce a calcine containing not more than about 2% sulfur; conditioning the said material before the end of the subsequent carbon monoxide pressure treatment with a controlled amount of promoting sulfur-bearing compound in such a manner that promoting sulfur is present in said material in an effective amount for the formation of metal carbonyls; reducing the calcine to obtain a reduced calcine containing nickel, cobalt and iron in an active metallic state in such a condition that when subjected to pressure treatment by carbon monoxide, the ratio of iron as carbonyl to nickel as carbonyl is not more than about 2 to 1 and not less than about 1 to 7; subjecting the thus-reduced product to pressure treatment by carbon monoxide at more than about 300 pounds per square inch gauge but not more than about 1000 pounds per square inch gauge within the temperature range of not less than about 175° F. and not more than about 350° F. to form carbonyls of nickel, cobalt and iron and leaving a solid residue containing the copper; separating the thus-formed nickel, cobalt and iron carbonyls from one another; decomposing the separated carbonyls to yield metals of high purity; and smelting the copper and precious metals-containing solid residue directly to anodes for electrolysis to recover copper and precious metals.

9. A process for the separation and separate recovery of cobalt, nickel and iron, and copper when present, from sulfide and arsenide materials containing these elements which comprises roasting the material to produce a calcine containing not more than about 2% total sulfur; reducing said calcine to form a reduced calcine product containing nickel, cobalt and iron in an active metallic state in such a condition that when subjected to pressure treatment by carbon monoxide the ratio of iron as carbonyl to nickel as carbonyl is less than about 2 to 1 and not less than about 1 to 7; cooling the reduced calcine; conditioning the cooled, reduced calcine before the end of the subsequent carbon monoxide pressure treatment with a controlled amount of promoting sulfur-bearing compound in such a manner that promoting sulfur is present in said reduced calcine in an effective amount for the formation of metal carbonyls; reacting the reduced and sulfur-promoted product with carbon monoxide under a pressure of more than about 300 pounds per square inch gauge and not more than about 1000 pounds per square inch gauge and at a temperature not less than about 175° F. and not more than about 350° F. to form carbonyls of nickel, cobalt and iron, leaving a solid residue; separating the thus-formed metal carbonyls from one another and decomposing the separated carbonyls to yield metals of high purity; and treating said residue to separately recover contained metal values therefrom.

10. A process for the separate recovery of cobalt, nickel and iron from a substantially sulfur-free material containing such elements in an active metallic state, in which metallic iron is present in such an amount that when said material is subjected to pressure treatment by carbon monoxide the ratio of iron as carbonyl to nickel and cobalt as carbonyls is less than about 2 to 1 and not less than about 1 to 7, which comprises conditioning the said material, before the end of the subsequent pressure treatment with carbon monoxide, with a controlled amount of sulfur-containing substance to effect an absorption of promoting sulfur by said material in such a manner that the sulfur content of the said material including any residual sulfur does not exceed about 1% of the original material and in such a manner that promoting sulfur is present in said material in an effective amount for the formation of metal carbonyls including cobalt carbonyl; and subjecting the thus-treated material containing said promoting sulfur to pressure treatment by carbon monoxide at more than about 300 pounds per square inch gauge but not more than about 1000 pounds per square inch gauge at temperatures within the range of about 175° F. to 350° F. during the pressure treatment to form metal carbonyls including cobalt carbonyl, with at least part of said pressure treatment conducted in the temperature range of not less than about 175° F. but less than about 275° F.; and separating the thus-formed carbonyls for separate recovery of the metals including at least about 75% of the cobalt in said material.

11. A process for the separate recovery of cobalt, nickel and iron from a substantially sulfur-free material containing such elements in an active metallic state, in which metallic iron is present in such an amount that when said material is subjected to pressure treatment by carbon monoxide the ratio of iron as carbonyl to nickel and cobalt as carbonyls is less than about 2 to 1 and not less than about 1 to 7, which comprises conditioning the said material, before the end of the subsequent pressure treatment with carbon monoxide, with a controlled amount of promoting sulfur-containing substance to effect an absorption of sulfur by said material in such a manner that the sulfur content of the said material including any residual sulfur does not exceed about 1% of the original material and in such a manner that promoting sulfur is present in said material in an effective amount for the formation of metal carbonyls including cobalt carbonyl; and subjecting the thus-treated material containing said promoting sulfur to pressure treatment by carbon monoxide at more than about 300 pounds per square inch gauge but not more than about 1000 pounds per square inch gauge and within the volatilization temperature range of not less than about 175° F. and less than about 275° F. to form metal carbonyls including cobalt carbonyl; and separating the thus-formed carbonyls for separate recovery of the metals including at least about 75% of the cobalt in said material.

12. A process for the separate recovery of nickel, cobalt and iron from an ore containing these elements which comprises treating said ore to obtain an iron-bearing matte; roasting the matte to produce a calcine containing not more than about 2% sulfur; reducing the calcine to obtain a reduced calcine containing nickel, cobalt and iron in an active metallic state in such amounts that upon being subjected to pressure treatment by carbon monoxide a ratio of iron as carbonyl to nickel and cobalt as carbonyls of not more than about 2 to 1 and not less than about 1 to 7 is obtained; cooling the reduced calcine; reacting the reduced calcine with carbon monoxide under a pressure of more than about 300 pounds per square inch gauge and not more than about 1000 pounds per square inch gauge and at temperatures within the range of about 150° F. to 350° F. to form nickel, cobalt and iron carbonyls, with at least a substantial portion of said pressure treatment being conducted at less than about 275° F.; removing any remaining nickel, cobalt and iron carbonyls from the solid residue; separating the nickel, cobalt and iron carbonyls from one another; and decomposing the separated carbonyls to yield metals of high purity.

13. A process for the separate recovery of nickel, cobalt, iron and copper from a sulfide ore containing these elements which comprises beneficiating said ore to obtain a concentrate; roasting said concentrate in an oxidizing atmosphere at a temperature between about 1300° F. and about 1600° F. to produce a calcine containing less than about 2% total sulfur and less than about 1% sulfide sulfur; specially reducing said calcine at a temperature below about 1600° F. and not below about 1300° F. in a controlled atmosphere containing at least one reducing gas from the group consisting of carbon monoxide and hydrogen and at least one oxidizing gas from the group consisting of carbon dioxide and water vapor with a reduction potential equivalent to a ratio of carbon monoxide to carbon dioxide of not more than about 3 to 2 and not less than about 1 to 3 to obtain a reduced calcine product, containing nickel, cobalt and iron in an active metallic state in such amounts that upon being subjected to pressure treatment by carbon monoxide a ratio of iron as carbonyl to nickel and cobalt as carbonyls of less than about 2 to 1 and not less than about 1 to 7 is obtained; cooling the reduced calcine; reacting the reduced calcine with carbon monoxide under a pressure of more than about 300 pounds per square inch gauge and not more than about 1000 pounds per square inch gauge and at temperatures within the range of about 150° F. to 350° F. to form nickel, cobalt and iron carbonyls, with at least a substantial portion of said pressure treatment being conducted at less than about 275° F.; removing any remaining nickel, cobalt and iron carbonyls from the solid residue containing copper present in the ore; separating the nickel, cobalt and iron carbonyls from one another; and decomposing the separated carbonyls to yield metals of high purity.

References Cited in the file of this patent
UNITED STATES PATENTS

| | | |
|---|---|---|
| 2,004,534 | Muller et al. | June 11, 1935 |
| 2,400,098 | Brogdon | May 14, 1946 |
| 2,478,942 | Queneau et al. | Aug. 16, 1946 |

UNITED STATES PATENT OFFICE
CERTIFICATE OF CORRECTION

Patent No. 2,944,883                                              July 12, 1960

Paul Etienne Queneau et al.

It is hereby certified that error appears in the above numbered patent requiring correction and that the said Letters Patent should read as corrected below.

Column 3, line 5, for "concentrates" read -- concentrate --; column 10, line 2, for "9%" read -- 90% --.

Signed and sealed this 17th day of April 1962

(SEAL)
Attest:

ESTON G. JOHNSON                                     DAVID L. LADD

Attesting Officer                                         Commissioner of Patents